United States Patent [19]
DeLoach

[11] Patent Number: 4,508,545
[45] Date of Patent: Apr. 2, 1985

[54] CLOSED LOOP WATER TREATING SYSTEM AND METHOD

[76] Inventor: Walter W. DeLoach, 818 Cattlemen Rd., Sarasota, Fla. 33582

[21] Appl. No.: 549,139

[22] Filed: Nov. 7, 1983

Related U.S. Application Data

[63] Continuation-in-part of Ser. No. 533,216, Sep. 19, 1983.

[51] Int. Cl.³ .............................................. B01D 19/00
[52] U.S. Cl. .......................................... 55/53; 55/94; 55/196; 55/227; 55/233; 210/151; 210/718
[58] Field of Search ................... 55/36, 38, 39, 53, 90, 55/89, 196, 227, 229, 233, 73; 210/718, 750, 696, 188, 198.1, 201, 209, 218, 615, 604, 620, 621, 150, 151, 194; 261/22, 29, 114 R

[56] References Cited

U.S. PATENT DOCUMENTS

| | | | |
|---|---|---|---|
| 1,725,925 | 8/1929 | Kent ........................................ | 210/750 |
| 2,858,903 | 11/1958 | Goetz et al. .............................. | 261/22 |
| 3,880,617 | 4/1975 | Shibuya et al. ........................ | 55/73 X |
| 3,907,523 | 9/1975 | Melin ....................................... | 55/73 |
| 3,972,966 | 8/1976 | Lund et al. ........................... | 261/114 R |
| 4,198,378 | 4/1980 | Giammarco et al. ............. | 423/223 X |
| 4,312,646 | 1/1982 | Fattinger et al. ................. | 55/227 X |

OTHER PUBLICATIONS

"Flue Gas Desulfurization", Joy Manufacturing Company, 9/73.

Primary Examiner—Charles Hart
Attorney, Agent, or Firm—Hauke and Patalidis

[57] ABSTRACT

A system for treating water includes an aerator or degasifier that is fluidly connected to a blower that moves gases released from the water cascading down in the aerator over slat trays or plastic packing media. The released gases enter a gas scrubber and are treated with an iron salt solution that removes undesirable gases and that form a sludge that is removed from the scrubber. The residual gases, mostly nitrogen, argon, and other minor gases found in ambient air, flow into the aerator.

In some instances, the gas scrubber also includes, in addition to the iron salt solution treating equipment, equipment for treating the released gases with caustic soda solution.

20 Claims, 3 Drawing Figures

CLOSED LOOP WATER TREATING SYSTEM AND METHOD

CROSS REFERENCE TO RELATED APPLICATION

This application is a continuation-in-part of application Ser. No. 533,216, filed Sept. 19, 1983.

BACKGROUND OF THE INVENTION

This invention pertains to water treating and purification systems and, more particularly, to a closed loop water treating system.

During the past few years, clean, pure water for personal consumption, and for industrial purposes has become scarcer than ever before. Waste water and effluent from industrial plants are contaminating underground waters, and the polluted streams are flowing into reservoirs from which potable water is drawn. It is now mandatory that water treating systems be set up to clean up these impure and hazardous water situations.

SUMMARY OF THE INVENTION

A water treating system in accordance with the invention comprises a closed loop configuration of apparatus that includes: an aerator or degasifier that receives contaminated water; slat trays or plastic media within the degasifier that distribute the water over the packing media; and an air resistor at the bottom of the degasifier.

The closed loop water treating system also includes a gas scrubber having sprays which emit a gas treating iron salt solution. The salt solution mixes and reacts with incoming gaseous fluid flowing from the aerator or degasifier 13 into the scrubber 15 and removes undesireable gases from the incoming gaseous fluid by forming a sludge which falls as a precipitate into a sludge collector. High and low sensors determine the need for more chemical solution in the system; and air relief ports conduct the treated gas to the bottom zone of the scrubber from which it flows into the aerator or degasifier.

In some instances, the water treating system of the present invention includes an aerator or degasifier like that shown in FIGS. 1 and 2, and a gas scrubber wherein both iron salt solution and caustic are used to treat gases flowing from the aerator or degasifier.

For a further understanding of the present invention, and for features and advantages thereof, reference may be made to the following description of the invention taken in conjunction with the drawings.

DETAILED DESCRIPTION

Figures 1, 2:
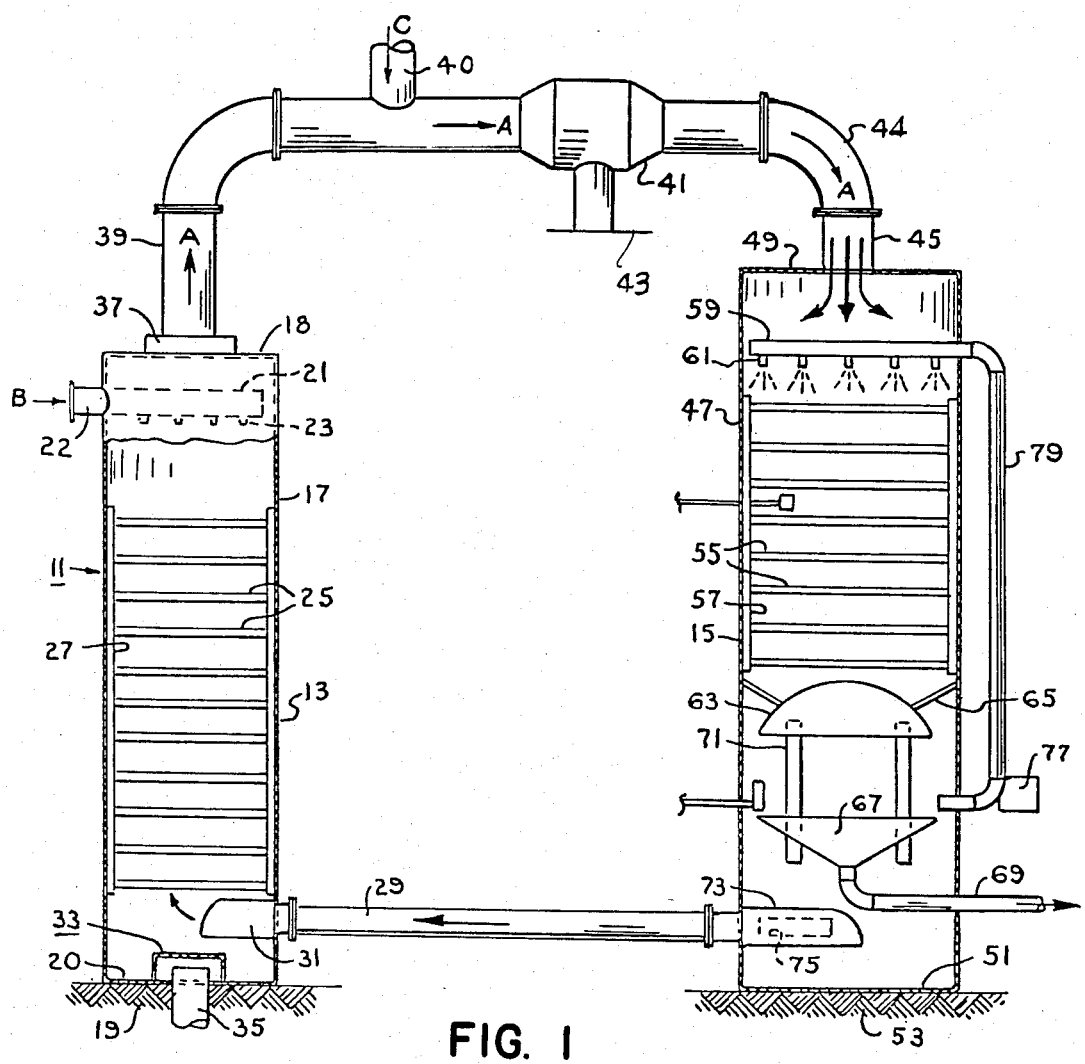
FIG. 1 is a schematic flow diagram illustrating equipment suitable for carrying into practice the method of the invention.
FIG. 2 is a schematic view of an air resistor forming a part of the equipment of the system shown in FIG. 1.

Referring to FIG. 1, a closed loop water treating system 11, in accordance with the invention, includes an aerator or degasifier unit 13 and a scrubber unit 15.

The aerator or degasifier unit 13 comprises a closed vertical structure including an envelope 17 having a top 18 and bottom 20. The envelope 17 is supported on the ground or other supporting surface 19. The aerator or degasifier unit 13 also includes a water inlet conduit 22 that carries water into an internal header 21 located near the top of the aerator or degasifier unit 13. A plurality of spray heads 23 are mounted into the header 21. Beneath the water inlet header 21 are a plurality of conventional slat trays or plastic packing media 25 mounted in conventional manner to a molded fiber glass frame supporting structure 27 within the envelope 17. The slat trays or plastic packing media 25 are spaced apart vertically in conventional manner, and are so constructed and arranged that water is distributed over the surface of the trays or media 25 as it cascades downward within the envelope 17, and gases entrained in the water are liberated from the solute water according to the respective partial pressure of the gases.

Extending into the envelope 17, near the bottom 20, is a gas conduit 29 that is so constructed and arranged that water cascading downward does not impede the flow of gas from the scrubber unit 15 into the envelope 17. The inner end portion of the gas conduit 29 is shaped, as at 31, to direct the water flow away from entering the conduit 29.

The bottom of the aerator or degasifier unit 13 is provided with an air resistor 33 and a downcomer 35 for product water. The air resistor 33 and the downcomer 35 are shown in FIG. 2 and are more particularly described hereinafter.

Disposed atop the aerator or degasifier unit 13 is a conventional demister 37 that prevents excessive loss of moisture from the aerator or degasifier unit 13.

Connected to the demister unit 37 is an exhaust gas conduit 39 that connects to the inlet end of a tube axial or other type of blower 41 that is suitably mounted to a support structure 43. The blower 41 is powered by a conventional electric motor (not shown) and is so arranged and constructed that gas is withdrawn from the aerator or degasifier unit 13, through the demister 37, and is urged in the direction of the arrows A through the blower 41 toward the gas scrubber unit 15. Conduit 44 connects the exhaust side of the blower 41 to the inlet conduit 45 of the gas scrubber unit 15.

Associated with the gas conduit 39 is an air make-up conduit 40 located about where shown in FIG. 1. The flow of ambient air in conduit 40 is controlled by means of vacuum sensors (not shown) that determine when additional gaseous fluid is required to keep the system full at all times.

The gas scrubber unit 15 comprises a closed vertical structure including an envelope 47 having a top 49 and bottom 51. The scrubber unit 15, like the aerator or degasifier unit 13, is supported on the ground or other suitable support base 53.

Beneath the top 49, within the envelope 47, is a wash header 59 to which are mounted a plurality of spray heads 61.

The scrubber unit 15 contains a plurality of vertically arranged spaced-apart slat trays or plastic packing media 55 of conventional type that are supported by side frame structure 57, and that are disposed beneath the spray heads 61. The slat trays or plastic packing media 55 and the frame structure 57 are made, preferably, of fiber glass or other suitable plastic material.

Beneath the lowermost slat tray or plastic packing media 55, is a dome-like shroud 63 that is suspended in position by support arms 65 fixed to the envelope 47 and to the shroud 63.

Beneath the shroud, about where shown in FIG. 1, is a conical sludge collector 67 that is fitted with a drain pipe 69 that extends through the envelope 47.

A plurality of vertically arranged tubular gaseous relief conduits 71 are disposed about where shown, and they are so constructed and arranged that the tops terminate within the shroud 63 and the bottoms below the lower edge of the sludge collector 67.

Beneath the sludge collector 67 and the drain pipe 69 is a hood 73 covering a conventional dewaterer unit 75. The hood is connected fluidly to the gas conduit 29 outside the envelope 47.

The wash header 59 is connected to a conduit 79 outside the envelope 47, that carries an iron salt solution from a recirculating pump 77 to the wash header 59.

In the bottom of the aerator or degasifier 13 is an air resistor 33, shown in FIG. 2, that comprises a hood 11 made, preferably, of fiber glass or other plastic material, that has a plurality of ports 83 in the bottom edge to permit water to flow into the hood. The hood 81 covers the product water drain pipe 35, and there is created a space between the top of the product water drain pipe and the top of the hood 81.

When the water treating system comprising the apparatus shown in FIGS. 1 and 2 is operational, water flows into the aerator or degasifier 13 in the direction of the arrow B through conduit 22 into the wash header 21. The water flows from the wash header 21 through the spray heads 23 onto the slat trays or plastic packing media 25 and downward in the envelope 17. The impingement action of the water falling from tray to tray, or onto the control film process with the packed media, causes the release of entrained gases, such as hydrogen sulfide, carbon dioxide, methane, if present in the water, and other ideal gases, if present, according to the partial pressure of the gases, in a conventional manner.

The gases liberated in the aerator or degasifier 13 are drawn upwards by the action of the axial blower or other type of blower 41, but the product water, free of such gases, collects in the bottom of the aerator or degasifier 13 and enters the air resistor 33. The water flows through the ports 83 and creates therein a minimum water column measured by the dimension G in inches. The dimension G will be great enough to maintain a water column that is greater than the static pressure within the envelope 17. Wherefore, gases liberated in the envelope 17 do not enter the air resistor 33. The liberated gases must, then, flow upward in the aerator or degasifier 13 through the demister 37 and into the conduit 39.

In the air resistor 33 the dimensions indicated by the letters D,E,F are determined by the volume of water to be treated. The size and number of the ports 83 are determined by both the flow rate and the water column G in inches needed to prevent the liberated gases from entering the product water drain pipe 35.

The liberated gases flow from the demister 37 into the tube axial or other type of blower 41, through conduit 44 and conduit 45 into the scrubber unit 15.

The gases flow downward in the scrubber unit 15 and are first treated with an iron salt solution emitted by the spray heads 61. The gaseous fluid reacts with the iron salt solution flowing downward over the slat trays or plastic packing media, and a sludge is created that precipitates onto the shroud 63. Thence the sludge flows into the sludge collector 67 and from the sludge collector 67 through conduit 69 out of the scrubber 15 to another place for disposal in a conventional manner.

The residual gaseous fluid in the bottom zone of the scrubber 15 flows into a hood 73, through a conventional dewaterer unit 75, and into conduit 29 leading to the bottom zone of the aerator or degasifier 13. The residual gaseous fluid in the bottom of the scrubber is free of contaminant gases except nitrogen, argon and the other minor gases found in air that is entrained in water entering the aerator or degasifier 13. The gaseous fluid flows upward in the aerator or degasifier and mixes with the gases liberated from water entering the aerator or degasifier.

Thus, the water treating system illustrated in FIGS. 1 and 2, constitute a closed loop system from which no obnoxious odors are released to the atmosphere.

Figure 3:
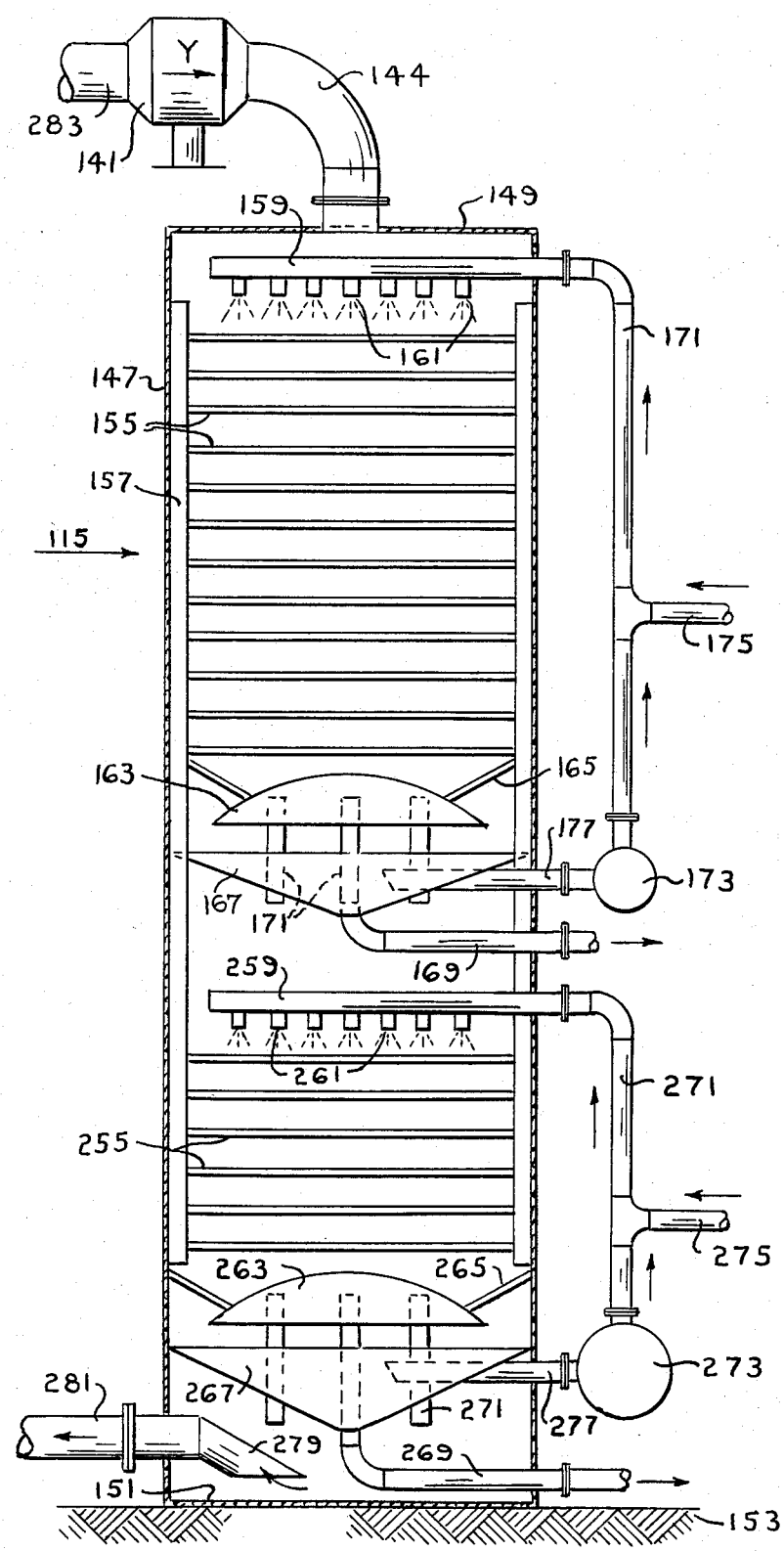
FIG. 3 is a schematic view of another scrubber used in the method of the invention.

Referring to FIG. 3, another form of gas scrubber 115 includes a closed vertical structure or envelope 147 having a top 149 and a bottom 151. The scrubber 115, like the scrubber 15 of FIG. 1, is fluidly connected and operates with an aerator or degasifier 13 like that shown in FIG. 1 and described hereinbefore.

The scrubber 115 is supported on the ground 153, or other suitable support medium. Beneath the top 149, within the envelope 147, is a wash header 159 to which are mounted a plurality of spaced-apart spray heads 161. Beneath the spray heads 161 is a first arrangement of a plurality of vertically spaced-apart slat trays or plastic packing media 155 of conventional construction that are disposed in the upper portion of the envelope 147. These slat trays or plastic packing media 155 are supported by side frame structure 157 within the envelope 147. Preferably, the slat trays or plastic packing media 155 and the side frame structure 157 are molded fiber glass or other suitable plastic material.

Beneath the lowermost slat tray 155 is a dome-like shroud 163 that is suspended in position by a plurality of support arms 165 fixed to the envelope 147 and to the shroud 163.

Beneath the shroud 163, about where shown in FIG. 3, is a conical sludge collector 167 that is fitted with a drain pipe 169 that extends outwardly through the envelope. The sludge collector 167 is supported around its perimeter by making contact with the envelope 147.

A plurality of vertically arranged tubular gaseous relief conduits 171 are disposed about where shown and they are so arranged and constructed that the tops thereof terminate within the shroud while the bottoms are located just below the sludge collector 167.

Beneath the drain pipe 169 is another wash header 259 to which are mounted a plurality of spray heads 261.

Beneath the spray heads 261 is a second arrangement of vertically spaced-apart slat trays or plastic packing media 255, of conventional type, that are disposed in the lower portion of the envelope 147. Preferably, the slat trays 255 and the side frame structure 157 are molded fiber glass, or other suitable plastic material.

Beneath the lowermost slat tray 255 is another dome-like shroud 263 that is suspended in position by a plurality of support arms 265 fixed to the envelope 147 and to the shroud 263.

Beneath the shroud 263, about where shown in FIG. 3, is another conical sludge collector 267 that is fitted with a drain pipe 269 that extends through the envelope 147. Like the shroud 163, the shroud 263 is also supported around its perimeter by being in contact with the envelope 147.

A plurality of gaseous relief conduits 271 are disposed about where shown and they are so arranged and constructed that the tops thereof terminate within the shroud 263 while the bottom of each conduit 271 terminates just below the conical sludge collector 267.

Outside the upper portion of the envelope 147 there is a conduit 171 which fluidly connects the wash header 159 to a pump 173 that recirculates a ferrous sulfate solution, originating from a storage tank (not shown) through a conduit 175 into the conduit 171. The pump 173 is also connected to a conduit 177 that extends through the envelope 147 into the space beneath the shroud 163.

In like manner, outside the envelope 147, near the bottom thereof, another conduit 271 connects the wash header 259 to a pump 273 that recirculates caustic solution, as required, that flows from a caustic solution supply tank (not shown). The caustic solution flows in conduit 275 into conduit 271. The pump 273 is also connected to conduit 277 that extends through the envelope 147 into the space beneath the shroud 263.

As shown in FIG. 3, the residual gaseous fluid in the lower zone of the scrubber 115 flows through the gas collector conduit 279 and conduit 281 extending outside the envelope 147. The conduit 279 carries the residual gaseous fluid to the bottom zone of the degasifier 13 under the influence of the axial blower 141 or other type of blower. Gaseous fluid flows through the blower 141 through conduit 144 into the top of the scrubber 115 in the direction of the arrow Y.

Now, then, when a water treating system that includes an aerator or degasifier 13, like that shown in FIGS. 1 and 2, and a gas scrubber 115, like that shown in FIG. 3, is operational, water flows into the aerator or degasifier 13 and product water flows therefrom through the product water conduit 35 as described herein previously. Liberated gases, under the influence of the blower 141 flow in conduit 283 through the blower 141 and conduit 143 into the scrubber 115.

The gaseous fluid is treated in the upper half portion of the scrubber 115 with an iron salt solution from the spray heads 161. The gases and the iron salt solution flow over the slat trays or plastic packing media 255 and impinge on the upper shroud 163. A sludge precipitate that forms in the scrubber 115 collects in the sludge collector 167, and is withdrawn therefrom through conduit 169 for disposal elsewhere.

Any carbon dioxide arising from the sludge, or being present in the scrubber 115, enters the gaseous relief conduits 171, and flows downward in the scrubber under the influence of the blower 141. In the lower portion of the scrubber 115, the carbon dioxide is treated with a solution of caustic soda from spray heads 261. The reaction of the carbon dioxide with the caustic soda solution produces a sludge that precipitates onto the shroud 263 and is collected in the sludge collector 267 from which it is withdrawn through conduit 269 for subsequent disposal elsewhere.

Persons skilled in the art will recognize that the gaseous fluid in the bottom zone of the scrubber 115 is, by now, free of hydrogen sulfide, if present initially; oxygen, if present initially; carbon dioxide, if present initially. Wherefore, the residual gaseous fluid now comprises nitrogen, argon, and the other minor gases found in ambient air. Such residual gaseous fluid flows into the lower zone of the aerator or degasifier 13 and is recycled with the gases liberated from the incoming water entering and being treated in the aerator or degasifier 13.

From the foregoing description of embodiments of the present invention, persons skilled in the art will recognize many features and advantages thereof, among which the following are significant:

That there are no exhaust gases that pollute the atmosphere;

That no obnoxious odors are released to the atmosphere;

That there is no dissolved oxygen in the product water so that equipment required to use pure water or nearly pure water like steam boilers, pumps, potable water systems, and the like, has a much greater service life, since the water is free of corrosive gases;

That a proper proportion of iron salts in the system is controlled by sensors;

That the air resistor prevents released gases from being carried with the product water from the aerator or degasifier;

That any required make-up water needed to keep the system full at all times enters through conduit 40 under control of automatic valving (not shown); and That the system of the invention pretreats water and eliminates oxygen from contacting the treated water and, therefore; does not cause dissolved materials to precipitate and foul other systems.

Although the invention has been described in relation to the embodiments shown in the drawings, it is understood that other modifications may be made therein without departing from the spirit of the invention as defined by the scope of the appended claims.

What is claimed is:

1. A system for treating water to remove undesirable gases entrained therein comprising,
   (a) a closed first chamber comprising a degasifier having in the top portion a fluid conduit with spray heads through which said water enters said first chamber and flows downward and impinges upon
   (b) a plurality of vertically spaced apart slat trays or plastic packing media supported in said chamber beneath said first fluid conduit whereby said entrained gases are released from said water which flows downward as product water free from entrained gases;
   (c) conduit means in said first chamber for conducting said product water therefrom;
   (d) means in said first chamber associated with said product water conduit for preventing said released gases from entering said product water conduit;
   (e) means for withdrawing said released gases from said first chamber and for flowing them into
   (f) a second gas scrubber closed chamber having a top and bottom and a fluid therein beneath said top with spray heads therein;
   (g) a plurality of vertically spaced-apart slat trays or plastic packing media supported in said second chamber beneath said fluid conduit;
   (h) means for flowing a chemical solution into and out of said fluid conduit which solution reacts with undesirable gaseous portions of the released gases entering said second chamber and forms a sludge that impinges on
   (i) a shroud mounted in said second chamber beneath said slat trays or plastic packing media, said sludge falling therefrom into
   (j) means mounted beneath said shroud for collecting said sludge and for removing said sludge from said second chamber;

(k) means for collecting the residual gaseous portions of said released gases and flowing said portions into the lower zone of said second chamber; and (l) means for removing said residual gases from said second chamber and flowing them into said first chamber.

2. The water treating system of claim 1 wherein, (a) said means for removing said residual gaseous fluid is a blower.

3. The water treating system of claim 1 including, (a) sensor means in said gas scrubber for determining when additional gas treating solution is required; and (b) means for introducing said additional solution into said gas scrubber.

4. The water treating system of claim 1 including, (a) means for introducing make-up air into said system as needed.

5. The water treating system of claim 4 wherein, (a) said means includes a conduit that carries make-up ambient air to the inlet side of said blower.

6. A system for treating water comprising in combination:

(a) a first chamber formed by a first envelope having a top and a bottom;

(b) a first frame supporting structure disposed within said first envelope;

(c) conduit means carrying water into the top portion of said first chamber;

(d) a plurality of spray heads in said conduit means;

(e) means supported by said first structure and disposed in vertical spaced-apart arrangement beneath said spray heads onto which water from said spray heads impinges whereby gases entrained in said water are released;

(f) an inlet conduit carrying gaseous fluid into the bottom of said first chamber;

(g) a product water conduit in the lower portion of said first chamber;

(h) means for preventing said released gases from flowing into said product water conduit;

(i) means for withdrawing said released gases from said first chamber and flowing said gases through a demister;

(j) conduit means carrying said released gases from said demister into a second chamber formed by an envelope and a top and a bottom;

(k) a second frame supporting structure disposed within said second chamber;

(l) a conduit having therein a plurality of spray heads disposed within said second chamber beneath said top and above a (m) plurality of slat trays or plastic packing media arranged in spaced-apart vertical orientation and carried by a second frame supporting structure within said second chamber;

(n) means for flowing a chemical solution through said spray heads that reacts with undesirable gaseous portions of said released gases passing over said slat trays or plastic packing media and form a sludge that precipitates onto (o) a shroud disposed within said second chamber and supported by said second frame supporting structure;

(p) means disposed within and carried by the envelope of said second chamber and disposed beneath said shroud for collecting said precipitate;

(q) means for removing said precipitate from said sludge collecting means;

(r) means for flowing residual gases into the lower zone of said second chamber; and (s) means for conducting said residual gases from said lower zone into the lower zone of said first chamber.

7. The invention of claim 6 wherein:

(a) said means for flowing said residual gases includes a plurality of conduit means communicating with a zone under said shroud and a lower zone in said second chamber.

8. The invention of claim 6 wherein:

(a) said chemical solution is a ferrous sulfate solution.

9. The invention of claim 6 wherein:

(a) said means for flowing said chemical solution includes a pump and conduit means connected fluidly to said conduit in said second chamber.

10. The invention of claim 6 including:

(a) means for dewatering said residual gases before they flow from said second chamber.

11. The invention of claim 9 including:

(a) means within said second chamber for determining when additional chemical solution is required in said conduit.

12. The invention of claim 6 wherein:

(a) said means for withdrawing said released gases from said first chamber is a blower.

13. The invention of claim 6 including:

(a) means in said conduit means carrying said released gases for admitting make-up ambient air as required into said conduit.

14. A system for treating water comprising in combination:

(a) a first chamber formed by a first envelope having a top and a bottom;

(b) a first frame supporting structure disposed within said first envelope;

(c) conduit means carrying water into the top portion of said first chamber;

(d) a plurality of spray heads in said conduit means;

(e) means supported by said first structure and disposed in vertical spaced-apart arrangement beneath said spray heads onto which water from said spray heads impinges whereby gases entrained in said water are released;

(f) an inlet conduit carrying gaseous fluid into the bottom of said first chamber;

(g) a product water conduit in the lower portion of said first chamber;

(h) means for preventing said released gases from flowing into said product water conduit;

(i) means for withdrawing said released gases from said first chamber and flowing said gases through a demister;

(j) conduit means carrying said released gases from said demister into a second chamber formed by an envelope having a top and bottom;

(k) a second frame supporting structure disposed within said second chamber;

(l) a conduit having therein a plurality of spray heads disposed within said second chamber beneath said top and above (m) a plurality of slat trays or plastic packing media arranged in spaced-apart vertical orientation and carried by said second frame supporting structure within said second chamber;

(n) means for flowing a chemical solution through said spray heads that reacts with undesirable gaseous portions of said released gases passing over said slat trays or plastic packing media and form a sludge that precipitates onto (o) a shroud disposed within said second chamber and supported by said second frame supporting structure;

(p) means disposed within and carried by said envelope of said second chamber and disposed beneath said shroud for collecting said precipitate;

(q) a second conduit having therein a plurality of spray heads disposed within the lower portion of said second chamber beneath said sludge collector and above (r) a plurality of slat trays or plastic packing media arranged in spaced-apart vertical orientation and carried by said second frame supporting structure within said second chamber;

(s) means for flowing a chemical solution through said second conduit and the spray heads therein that reacts with undesirable gaseous portions of gases passing over said slat trays or plastic packing media and forms a sludge that precipitates onto (t) a second shroud disposed within said second chamber and supported by said second frame supporting structure;

(u) means disposed within and carried by said envelope of said second chamber and disposed beneath said second shroud for collecting said precipitate;

(v) means for removing said precipitate from said sludge collecting means;

(w) means for flowing residual gases into the lower zone of said second chamber; and (x) means for conducting said residual gases from said lower zone into the lower zone of said first chamber.

15. The invention of claim 14 wherein:
(a) said first chemical solution is a ferrous sulfate solution.

16. The invention of claim 14 wherein:
(a) said means for flowing said first chemical solution is a pump and conduit means connected fluidly to said first conduit in said second chamber.

17. The invention of claim 14 wherein:
(a) said second chemical solution is a caustic soda solution.

18. The invention of claim 14 wherein:
(a) said means for flowing said second chemical solution is a pump and conduit means connected fluidly to said second conduit in said second chamber.

19. The method for treating water comprising the steps of:
(a) flowing water into a first chamber through spray heads in a conduit therein;
(b) flowing said water over a plurality of slat trays or plastic packing media disposed beneath said conduit;
(c) releasing entrained gases from said water and creating thereby product water;
(d) flowing said product water into the bottom of said first chamber;
(e) creating in the bottom of said first chamber means for preventing said released gases from flowing through said means with said product water;
(f) flowing said product water from said first chamber;
(g) flowing said released gases from said first chamber through a demister into a second chamber;
(h) flowing said released gases downwardly in said second chamber and contacting said released gases with an iron salt solution in said second chamber;
(i) flowing said iron salt treated gases over slat trays or plastic packing media and forming a sludge that precipitates;
(j) collecting and removing said sludge from said second chamber;
(k) flowing said iron salt treated gases from said second chamber into said first chamber; and
(l) introducing make-up ambient air into said second chamber as required.

20. The invention of claim 17 including the steps: p1 (a) flowing said iron salt solution treated gases downwardly in said second chamber;
(b) flowing a caustic soda solution into said second chamber and contacting said iron salt solution treated gases;
(c) flowing the caustic soda solution treated gases over slat trays or plastic packing media and forming another sludge that precipitates;
(d) collecting and removing from said second chamber said another sludge; and
(e) flowing said caustic soda solution treated gases from said second chamber into said first chamber.

* * * * *

UNITED STATES PATENT AND TRADEMARK OFFICE
CERTIFICATE OF CORRECTION

PATENT NO.   :   4,508,545
DATED        :   April 2, 1985
INVENTOR(S)  :   Walter W. DeLoach It is certified that error appears in the above-identified patent and that said Letters Patent is hereby corrected as shown below:

Col. 3, line 17, delete "11" and insert --81--.

Col. 3, line 20 after "hood" first occurrence, insert --81--.

Col. 10, line 35, delete "17" and insert --19--.

Col. 10, line 35, delete "p1".

Signed and Sealed this

Eighth Day of December, 1987

Attest:

DONALD J. QUIGG

Attesting Officer            Commissioner of Patents and Trademarks